United States Patent [19]

Margetts

[11] Patent Number: 5,069,316
[45] Date of Patent: Dec. 3, 1991

[54] BRAKE ACTUATOR WITH ADJUSTER

[75] Inventor: Hugh G. Margetts, Ross on Wye, England

[73] Assignee: Lucas Industries Public Limited Company, Birmingham, England

[21] Appl. No.: 549,167

[22] Filed: Jul. 6, 1990

[30] Foreign Application Priority Data

Jul. 13, 1989 [GB] United Kingdom ............... 8916047

[51] Int. Cl.⁵ ............................................ F16D 51/00
[52] U.S. Cl. ........................... 188/79.62; 188/196 BA
[58] Field of Search ......... 188/79.62, 196 BA, 196 V; 192/111 A

[56] References Cited

U.S. PATENT DOCUMENTS 4,380,277 4/1983 Ingram et al. ............... 188/196 BA
4,702,352 10/1987 Ingram et al. .................... 188/79.62

Primary Examiner—Robert J. Oberleitner
Assistant Examiner—Chris Schwartz
Attorney, Agent, or Firm—Staas & Halsey

[57] ABSTRACT

A brake actuator has a force applying device actuated by a rotary actuator shaft and arranged to separate opposed tappets to actuate braking elements. Each tappet includes a pair of threadedly engaged members which are relatively rotatable to enable the length of each tappet to be adjusted. An adjuster control device is operable to vary the length of one of the tappets and a transmission device interconnects the tappets to effect a corresponding variation in length of the other tappet. The transmission device, a ring gear, lies within the actuator housing at a location adjacent the axially inner end of the force applying device and cooperates with both tappets to transmit adjusting movement of one tappet to the other.

15 Claims, 4 Drawing Sheets

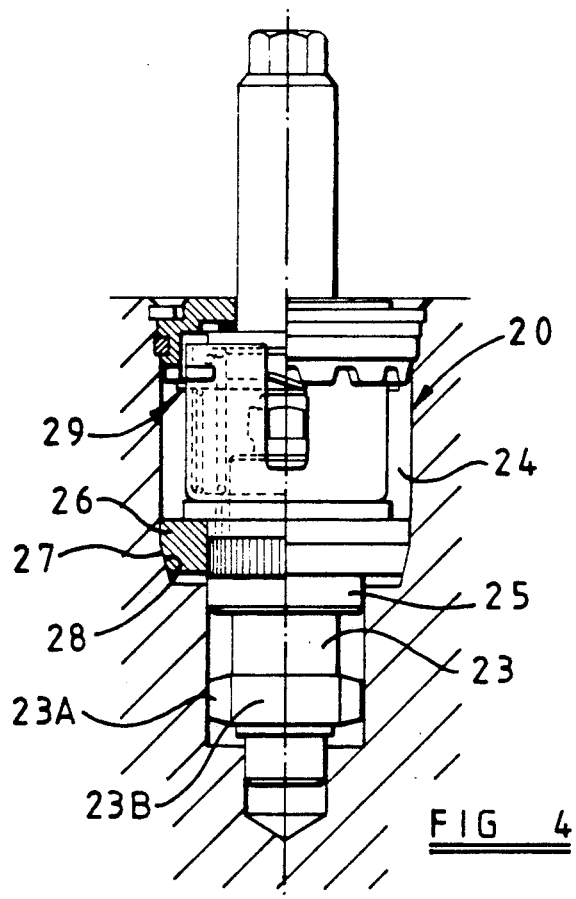
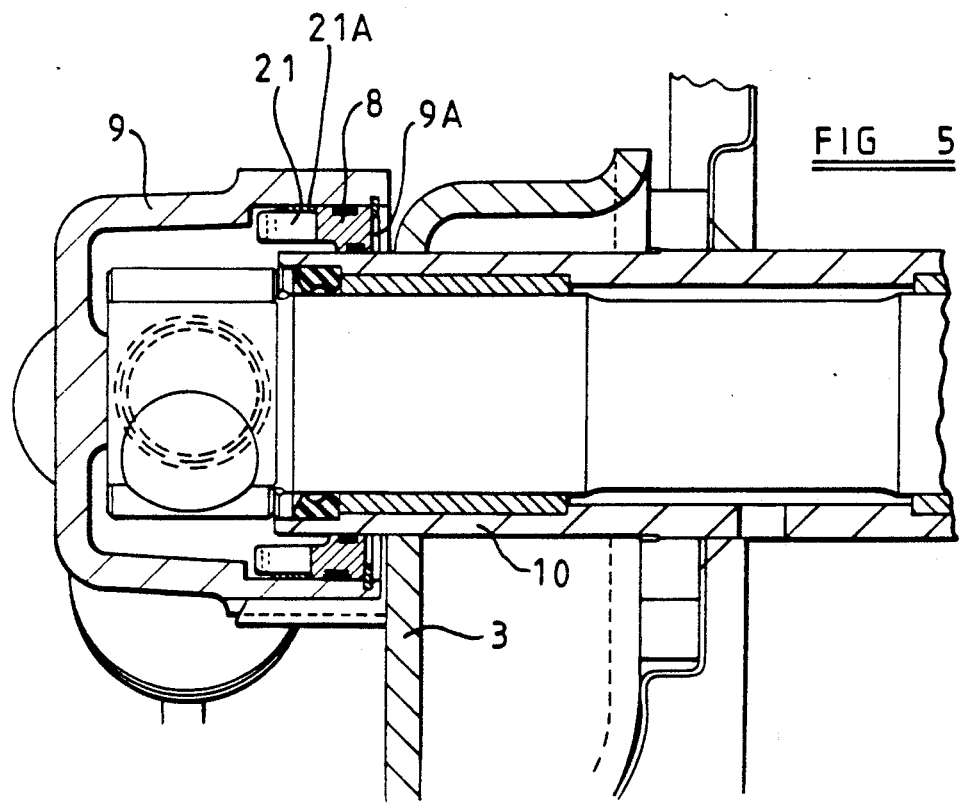

BRAKE ACTUATOR WITH ADJUSTER

This invention relates to a brake actuator, primarily for use in a vehicle and being of the general kind including force-applying means actuated by a rotary actuator shaft and arranged to separate opposed tappets which transmit thrust from said means to braking elements engaged, in use, by the tappets in order to urge said elements against a rotary braking surface, each tappet including a pair of threadedly interengaged members which are relatively rotatable to enable the length of each tappet to be varied, adjuster means operable in response to excessive outward movement of the braking elements, to vary the length of one of the tappets in order to maintain a substantially constant predetermined clearance between the associated braking element and said braking surface, and transmission means interconnecting the tappets to effect a corresponding variation in length of the other tappet.

An actuator of this general kind is illustrated in an earlier British Patent No. 2062784, and includes an adjuster in which the transmission means is either a crown wheel or a cross shaft interconnecting the tappets and disposed axially beyond the free end of the force-applying means, illustrated as a cam. Since the crown wheel diameter or the length of the cross-shaft needs to be greater than the greatest sectional dimension of the cam, these components have to be assembled into the actuator housing at the free end of the cam and it is then necessary to seal the housing using a cover plate, which entails machining the housing and the use of seals, gaskets and fixing means for the plate. A further disadvantage of the aforesaid arrangement is that it extends the effective length of the actuator, leading to potential installation problems.

SUMMARY OF THE INVENTION

An object of the present invention is to provide a brake actuator in which the aforesaid disadvantages are minimized or avoided.

According to the invention, the transmission means of a brake actuator of the aforesaid general kind lies within the actuator housing at a location adjacent the axially inner end of the cam in the longitudinal direction of the actuator shaft, the transmission means cooperating with both tappets to transmit adjusting movement of one tappet to the other.

In one convenient arrangement, the transmission means is a ring gear arranged co-axially with the actuator shaft.

Typically, the force-applying means is a cam rotatable by and conveniently integral with the actuator shaft, the cam being disposed in a part of the actuator housing which also houses the ring gear and a bearing for the actuator shaft, said housing part being preferably integral with a torque plate of the brake.

DESCRIPTION OF THE DRAWINGS

The invention will now be described, by way of example, with reference to the accompanying drawings in which:

FIG. 4 is a part cross-section along the line B—B of FIG. 2 in the direction of the arrows, and FIG. 5 is a view similar to FIG. 3 illustrating an alternative embodiment of the actuator of the invention.

DESCRIPTION OF THE PREFERRED EMBODIMENTS

Figure 1:
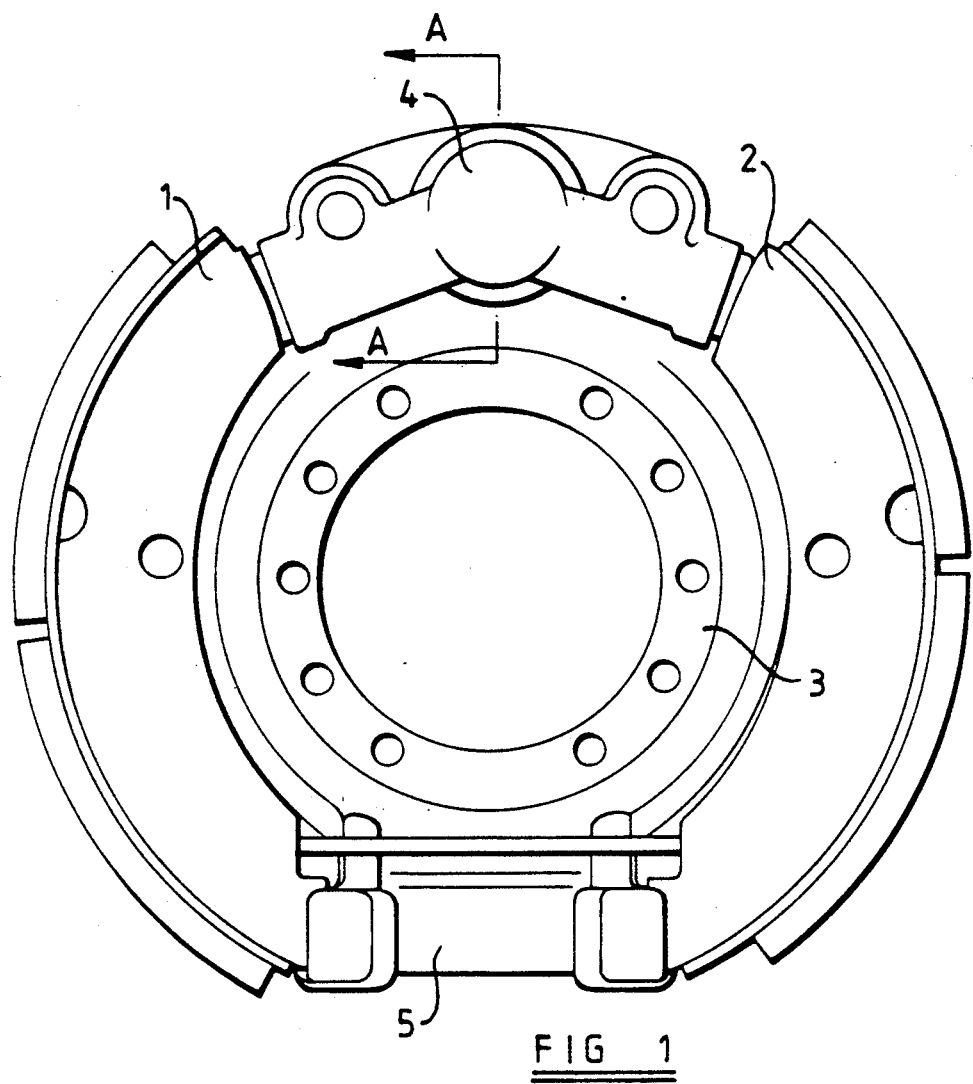
FIG. 1 is an end view of an internal shoe drum brake incorporating one form of the actuator of the invention.

The internal shoe drum brake illustrated in FIG. 1 of the drawings includes a pair of brake shoes 1, 2 mounted on a stationary torque plate 3 which also carries a cam-type actuator 4 disposed between one pair of adjacent shoe ends and operable to urge the shoes outwardly into braking engagement with a brake drum (not shown) against the action of shoe return means (not shown). The other adjacent shoe ends engage an abutment 5 which is secured to or integral with the torque plate 3. The brake illustrated would normally act as a leading/trailing shoe brake with each of the shoes playing a leading or trailing role depending upon the direction of rotation of the brake drum, as will be well understood by those familiar with the art.

Figure 2:
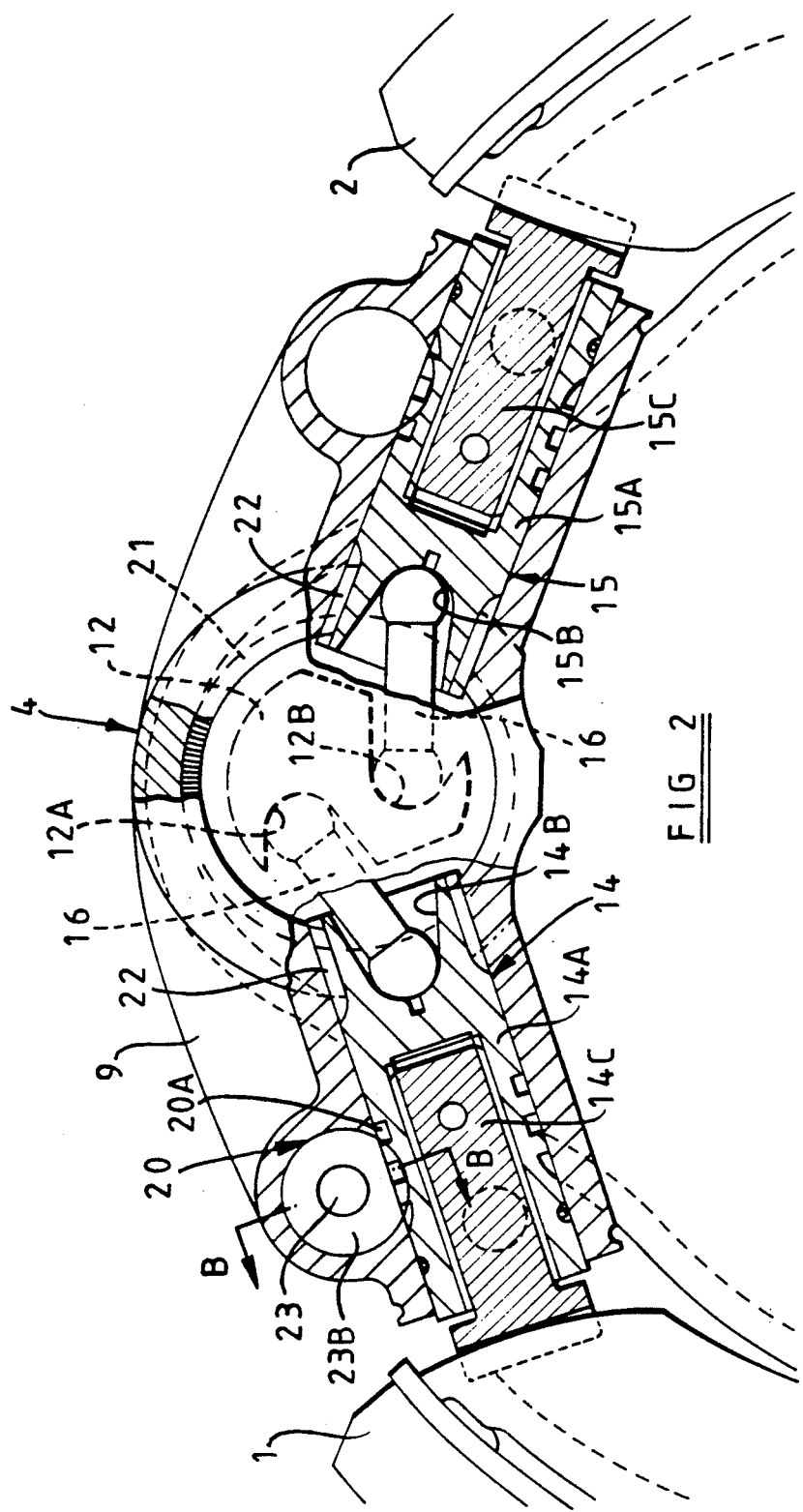
FIG. 2 is an enlarged longitudinal cross-section of the actuator in the brake of FIG. 1.
Figure 3:
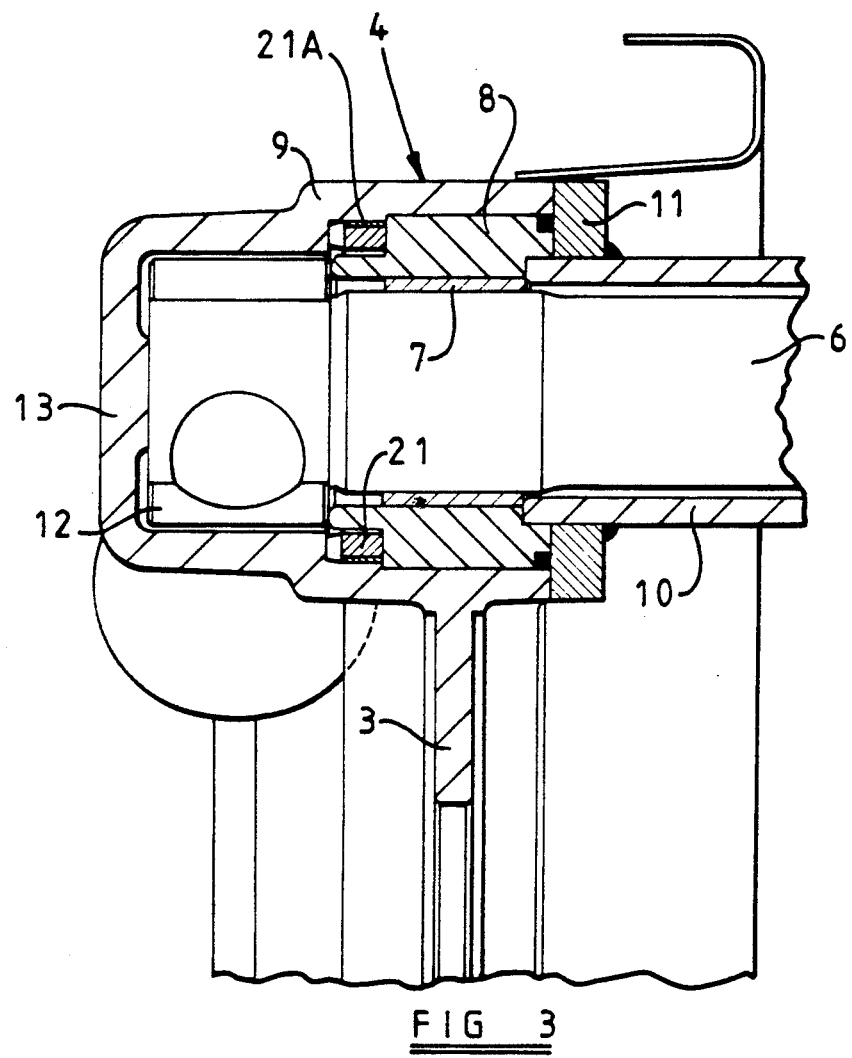
FIG. 3 is an enlarged cross-section along the line A—A of FIG. 1 in the direction of the arrows.

As will be seen more clearly from FIGS. 2 and 3, the actuator 4 includes a cam shaft 6, of which a forward end portion is rotatably mounted in a bearing 7 carried by a packing piece 8 itself mounted in an actuator housing 9 which, in the present embodiment, is formed integrally with the torque plate 3. The cam shaft is mounted within a coaxial tube 10, a flange 11 of which is secured to an open end of the housing 9 and extends over the adjacent end of the packing piece to retain the latter in the housing. The forward end portion of the shaft 6 has mounted thereon or is formed integrally with a cam 12 housed within a portion of the housing which is bounded by an integral end wall 13.

From FIG. 2, it will be seen that the housing contains a conventional arrangement of opposed tappet assemblies 14, 15, each of which includes a sleeve 14A, 15A slidable in a bore of the housing 9. The sleeves 14A, 15A contain respective part-spherical recesses 14B, 15B which receive the adjacent complementary part-spherical end portions of struts 16, the other similarly shaped strut end portions being received within complementary pockets 12A, 12B formed in the cam 12. Rotation of the cam in the appropriate direction urges the struts and consequently the tappet assemblies 14, 15 outwardly to separate the shoes 1 and 2 into braking engagement with a surrounding brake drum. Each tappet assembly includes an externally non-reversibly threaded stem 14C, 15C, the outer end portions of which engage the shoes 1 and 2 in a manner which locks the stems against rotation. Rotation of the sleeves 14A, 15A in one direction causes the stems to be screwed axially outwardly for adjustment purposes.

The tappet assembly 14 is operatively associated with an adjuster mechanism indicated generally at 20, operation of which causes the sleeve 14A to rotate in order to cause the aforesaid axial extending movement of the stem 14C, in the manner to be described. Adjusting movement of the tappet 14 is transmitted to the tappet 15 by a ring gear 21 which is shown rotatably mounted in a surrounding bearing 21A which may be fixed to the interior of the housing 9 or to the outer periphery of the gear ring 21. The bearing may alternatively be disposed between the internal periphery of the ring gear and an opposed cylindrical surface of the packing piece 8, being fixed to either the ring or the packing piece. The bearing and/or the ring gear may advantageously incorporate or be covered with anti-friction material. The ring gear bridges between the tappet sleeves 14A, 15A and engages corresponding teeth 22 thereon. It can be clearly seen from FIG. 3 that the ring gear 21 is disposed inwardly, in a direction longitudinally of the cam shaft, of the axially inner end of the cam 12. It will be seen that all of the components of larger diameter than the cam are now housed inwardly of the latter and it is not therefore necessary to gain access to the housing from the forward end of the cam. The cam may therefore be housed in a chamber having the integral end wall 13, obviating the necessity for complicated closure members and sealing devices. The overall length of the cam shaft assembly is correspondingly decreased, facilitating its installation in locations where space is at a premium.

One possible form of the adjuster 20 is illustrated in FIG. 4. This adjuster includes an adjuster shaft 23 rotatably mounted in a bore 24 of the housing which is stepped to receive various parts of the adjuster shaft and its associated mechanism which have different diameters. Teeth 23A on a pinion 23B carried by the adjuster shaft are engaged with a helical tooth formation 20A on the outer surface of the tappet sleeve (FIG. 2). A larger diameter portion 25 of the adjuster shaft carries a clutch member 26 fast for rotation therewith. The clutch member 26 has a conical clutch face 27 which normally cooperates with a corresponding conical clutch face 28 formed on the internal wall of the housing. A ratchet mechanism, indicated generally at 29 but not described in detail, is provided to permit rotation of the adjuster shaft 23 in a direction such as to effect adjustment, but not in a de-adjustment direction.

When the brake is actuated by rotation of the cam 12, the tappet assemblies 14, 15 are urged outwardly in order to separate the shoes 1 and 2 into braking engagement with the brake drum. A predetermined amount of backlash is provided between the teeth 23A and the teeth 20A on the tappet sleeve 14A to permit the shoes to move outwardly sufficiently to take up the maximum desired shoe to drum clearance without causing operation of the automatic adjuster. When wear of the friction linings becomes such that the shoe movement exceeds that required to take up this maximum clearance, the flanks of the teeth 23A and 20A come into engagement in such a manner as to lift the adjuster shaft 23 and thereby cause the clutch 26 to be disengaged from the seat 28, permitting rotation of the adjuster shaft to occur dependent upon the amount of shoe outward movement. The ratchet mechanism 29 is arranged to permit this rotational movement to occur. When the brake shoes move inwardly under the action of the shoe return means, the backlash between the teeth 23A and 20A is taken up in the opposite direction, permitting the clutch 26 to re-engage the face 28, whereupon the tappet sleeve 14A, rotates by interaction between these teeth such as to lengthen this tappet and thereby set a new retracted position for the shoe 1. Corresponding adjustment of the other adjuster sleeve 15A is effected by virtue of the ring gear connection between the respective sets of teeth 22 on the sleeves.

An alternative form of the actuator of the invention is illustrated in FIG. 5. The principal difference between this arrangement and that described previously is that the housing 9 is now formed separately from the torque plate 3 and the ring gear 21 packing piece 8 are retained within the housing by way of a circlip 9A. The separate housing may advantageously be made of material different from the torque plate, giving the possibility of weight saving by using a die-cast alloy or molded hard plastic housing. Moreover, the ring gear 21 and its bearing 21A, together with the packing piece 8 may be assembled into the housing and retained therein by the circlip 9A to form a self-contained housing, which arrangement can facilitate assembly of the actuator on the brake during manufacture and subsequent dismantling for servicing. It will be seen that the ring gear 21 is again disposed adjacent the axially inner end of the cam 12 in the longitudinal direction of the actuator, giving rise to the advantages enumerated above in connection with the previous embodiment.

The bearing 21A is again illustrated between the outer periphery of the ring gear 21 and inner periphery of the housing 9, being fixed to one or the other but may alternatively be disposed between the internal periphery of the ring gear and the outer surface of the support tube 10 which projects within the housing 9, the bearing being fixed either to the ring gear or tube, as required. Again, either the bearing or ring gear or both may incorporate or be covered with anti-friction material.

It will be understood that any convenient form of adjuster may be used in place of that described above for adjustment of one of the tappets, the other tappet being adjusted simultaneously by suitable transmission means disposed adjacent the axially inner end of the cam in the longitudinal direction of the actuator shaft and cooperating with both tappets.

I claim:

1. A brake actuator comprising: an actuator housing, force-applying means received by said housing and connected at an axially inner end thereof to a rotary actuator shaft for actuation by the rotary actuator shaft and arranged to separate opposed first and second tappets which transmit thrust from said means to braking elements engaged, in use, by the first and second tappets in order to urge said elements against a rotary braking surface, each first and second tapper including a pair of threadedly interengaged members which are relatively rotatable to enable the length of each first and second tappet to be varied, adjuster means operable in response to excessive outward movement of the braking elements, to vary the length of the first tapper in order to maintain a substantially constant predetermined clearance between the associated braking element and said braking surface, and transmission means interconnecting the first and second tappets to effect a corresponding variation in length of the second tappet, and wherein the transmission means lies within the actuator housing at a location adjacent the axially inner end of the force-applying means in the longitudinal direction of the rotary actuator shaft, the transmission means cooperating with both first and second tappets to transmit adjusting movement of the first tappet to the second tappet.

2. A brake actuator according to claim 1, wherein the transmission means is a rotatably mounted ring gear coaxially arranged with the actuator shaft.

3. A brake actuator according to claim 2, wherein the ring gear is rotatably mounted by way of a bearing disposed between the ring gear and the actuator housing.

4. A brake actuator according to claim 2, wherein the ring gear is rotatably mounted by way of a bearing disposed between the internal periphery of the ring gear and a fixed structure extending within the ring gear.

5. A brake actuator according to claim 2, wherein the force-applying means is a cam rotatable by the actuator shaft.

6. A brake actuator according to claim 1, wherein the adjuster means effects adjustment of the first tappet by way of a toothed pinion carried by an adjuster shaft, the teeth of the pinion engaging a corresponding tooth formation on a rotatable part of said first tappet.

7. A brake actuator according to claim 6, wherein the adjuster shaft extends generally perpendicular to the axis of the first tappet.

8. A brake actuator according claim 7, wherein the cam is disposed in a part of the actuator housing which also houses the ring gear and a bearing for the actuator shaft.

9. A brake actuator according to claim 8, wherein said part of the actuator housing is integral with a torque plate of the brake.

10. A brake actuator according to claim 8, wherein said part of the actuator housing is formed separately from the torque plate and the ring gear is retained within the housing by retention means to form therewith a self-contained unit.

11. A brake actuator according to claim 10, wherein the said part of the actuator housing is made from a material different from that of the torque plate.

12. A brake actuator to claim 1, wherein the force-applying means is a cam rotatable by the actuator shaft.

13. A brake actuator comprising an actuator housing, force-applying means received by said housing and connected at an axially inner end thereof to a rotary actuator shaft for actuation by the rotary actuator shaft and arranged to separate opposed first and second tappets which transmit thrust from said means to braking elements engaged, in use, by the first and second tappets in order to urge said elements against a rotary braking surface, each first and second tappet including a pair of threadedly interengaged members which are relatively rotatable to enable the length of each first and second tappet to be varied, adjuster means operable in response to excessive outward movement of the braking elements, to vary the length of the first tappet in order to maintain a substantially constant predetermined clearance between the associated braking element and said braking surface, and transmission means interconnecting the first and second tappets to effect a corresponding variation in length of the second tappet, wherein the transmission means lies within the actuator housing at a location adjacent the axially inner end of the force-applying means in the longitudinal direction of the rotary actuator shaft, the transmission means cooperating with both first and second tappets to transmit adjusting movement of the first tappet to the second tappet, and wherein the transmission means is a rotatably mounted ring gear co-axially arranged with the actuator shaft.

14. A brake actuator comprising an actuator housing, force-applying means received by said housing connected at an axially inner end thereof to a rotary actuator shaft for actuation by the rotary actuated shaft and arranged to separate opposed first and second tappets which transmit thrust from said means to braking elements engaged, in use, by the first and second tappets in order to urge said elements against a rotary braking surface, each first and second tappet including a pair of threadedly interengaged members which are relatively rotatable to enable the length of each first and second tappet to be varied, adjuster means operable in response to excessive outward movement of the braking elements, to vary the length of the first tappets in order to maintain a substantially constant predetermined clearance between the associated braking element and said braking surface, and transmission means interconnecting the first and second tappets to effect a corresponding variation in length of the second tappet, wherein the transmission means lies within the actuator housing at a location adjacent the axially inner end of the force-applying means in the longitudinal direction of the rotary actuator shaft, the transmission means cooperating with both the first and second tappets to transmit adjusting movement of the first tappet to the second tappet, and wherein the transmission means is a rotatably mounted ring gear co-axially arranged with the actuator shaft, and wherein the ring gear is rotatably mounted by way of a bearing disposed between the ring gear and the actuator housing.

15. A brake actuator comprising an actuator housing, force-applying means received by said housing connected at an axially inner end thereof to a rotary actuator shaft for actuation by the rotary actuated shaft and arranged to separate opposed first and second tappets which transmit thrust from said means to braking elements engaged, in use, by the first and second tappets in order to urge said elements against a rotary braking surface, each first and second tappet including a pair of threadedly interengaged members which are relatively rotatable to enable the length of each first and second tappet to be varied, adjuster means operable in response to excessive outward movement of the braking elements, to vary the length of the first tappets in order to maintain a substantially constant predetermined clearance between the associated braking element and said braking surface, and transmission means interconnecting the first and second tappets to effect a corresponding variation in length of the second tappet, wherein the transmission means lies within the actuator housing at a location adjacent the axially inner end of the in the longitudinal direction of the rotary actuator shaft, the transmission means cooperating with both first and second tappets to transmit adjusting movement of the first tappet to the second, wherein the transmission means is a rotatably mounted ring gear co-axially arranged with the actuator shaft, and wherein the ring gear is rotatably mounted by way of a bearing disposed between the internal periphery of the ring gear and fixed structure extending within the ring gear.

* * * * *